(12) United States Patent
Winter et al.

(10) Patent No.: US 9,789,653 B2
(45) Date of Patent: Oct. 17, 2017

(54) RAMPED STIFFENER AND APPARATUS AND METHOD FOR FORMING THE SAME

(71) Applicant: Airbus Operations Limited, Bristol (GB)

(72) Inventors: Darren John Winter, Bristol (GB); Martin Hampden Yates, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 637 days.

(21) Appl. No.: 14/052,421

(22) Filed: Oct. 11, 2013

(65) Prior Publication Data

US 2014/0037778 A1 Feb. 6, 2014

Related U.S. Application Data

(62) Division of application No. 13/003,884, filed as application No. PCT/GB2009/050846 on Jul. 14, 2009, now Pat. No. 8,662,873.

(30) Foreign Application Priority Data

Jul. 18, 2008 (GB) .................................... 0813161.7

(51) Int. Cl.
B29C 70/50 (2006.01)
B29D 99/00 (2010.01)

(52) U.S. Cl.
CPC ............ B29C 70/50 (2013.01); B29C 70/504 (2013.01); B29D 99/0007 (2013.01); *Y02T 50/433* (2013.01); *Y10T 428/24661* (2015.01)

(58) Field of Classification Search
CPC ..... B29C 70/50; B29C 70/504; B29D 99/007; Y10T 428/24661; Y02T 50/433

(Continued)

(56) References Cited

U.S. PATENT DOCUMENTS 2,471,490 A 5/1949 Mercer
2,655,194 A 10/1953 Nilsson
(Continued)

FOREIGN PATENT DOCUMENTS

DE 1452724 5/1969
DE 1452724 A1 5/1969
(Continued)

OTHER PUBLICATIONS

Russian Office Action, Decision on Granting with English translation dated Jun. 18, 2013.
(Continued)

*Primary Examiner* — Nahida Sultana
(74) *Attorney, Agent, or Firm* — Hauptman Ham, LLP

(57) ABSTRACT

A die tool for forming a C-section component having radiused shoulders, the includes a cylindrical inner die and an outer die having a cylindrical central portion connected to opposing end flanges by respective radiused concave portions. A portion of the inner die is arranged to be disposed between the end flanges of the outer die and spaced apart therefrom to define a cavity corresponding to the desired cross-section of the C-section component to be formed. The radiused convex and concave portions have a radius of curvature that varies about the circumference of the respective inner and outer dies. The inner and outer dies are rotatable such that the radius of curvature of the radiused convex and concave portions where the inner and outer dies are adjacent to one another varies as the inner and outer dies are rotated.

5 Claims, 11 Drawing Sheets

(58) Field of Classification Search
USPC .............. 425/112, 183, 329, 335–336, 363,
425/DIG. 6; 264/257
See application file for complete search history.

(56) References Cited

U.S. PATENT DOCUMENTS

| | | | |
|---|---|---|---|
| 3,355,922 | A | 12/1967 | Utashiro et al. |
| 3,657,911 | A | 4/1972 | Clarke et al. |
| 3,838,590 | A | 10/1974 | Van Dijk |
| 4,006,617 | A | 2/1977 | Foster |
| 4,084,029 | A | 4/1978 | Johnson et al. |
| 4,331,723 | A | 5/1982 | Hamm |
| 4,614,632 | A * | 9/1986 | Kezuka ............... B29C 51/08 264/280 |
| 4,913,910 | A | 4/1990 | McCarville |
| 5,026,447 | A | 6/1991 | O'Connor |
| 5,036,688 | A | 8/1991 | Gillean |
| 5,074,139 | A | 12/1991 | Elliot |
| 5,096,525 | A | 3/1992 | Engwall |
| 5,171,510 | A | 12/1992 | Barquet et al. |
| 5,182,060 | A | 1/1993 | Berecz |
| 5,340,518 | A * | 8/1994 | Paul ................... B29C 53/26 264/154 |
| 5,538,589 | A | 7/1996 | Jensen et al. |
| 5,729,462 | A | 3/1998 | Newkirk et al. |
| 5,792,487 | A * | 8/1998 | Wenning ............ B29C 53/28 264/151 |
| 5,820,804 | A | 10/1998 | Elmaleh |
| 5,984,511 | A | 11/1999 | Vasey-Glandon et al. |
| 6,114,012 | A | 9/2000 | Amaoka et al. |
| 6,355,133 | B1 | 3/2002 | Williams |
| 6,478,922 | B1 | 11/2002 | Rosevear et al. |
| 6,513,757 | B1 | 2/2003 | Amaoka et al. |
| 6,569,371 | B1 | 5/2003 | Asari et al. |
| 6,701,990 | B1 | 3/2004 | Burley et al. |
| 6,783,718 | B2 | 8/2004 | Blanchon et al. |
| 6,814,916 | B2 | 11/2004 | Wilden et al. |
| 6,890,470 | B2 | 5/2005 | Staub et al. |
| 7,141,199 | B2 | 11/2006 | Sana et al. |
| 7,195,203 | B2 | 3/2007 | Livingstone et al. |
| 7,469,735 | B2 | 12/2008 | Brown et al. |
| 7,682,682 | B2 | 3/2010 | Leon-Dufour et al. |
| 2004/0091563 | A1 * | 5/2004 | Saito ..................... B29C 43/46 425/363 |
| 2004/0136079 | A1 * | 7/2004 | Goggins ............. B29C 59/04 359/619 |
| 2005/0116374 | A1 * | 6/2005 | Ogawa ................. B29C 47/92 264/103 |
| 2007/0040301 | A1 * | 2/2007 | Jackson ............... B29C 55/08 264/290.2 |
| 2007/0175573 | A1 | 8/2007 | Fox et al. |
| 2009/0130242 | A1 * | 5/2009 | Qureshi ............ A61F 13/49011 425/335 |
| 2012/0177768 | A1 * | 7/2012 | Johnson ........... B29D 11/00288 425/363 |
| 2015/0217502 | A1 * | 8/2015 | Abraham .............. B29C 43/222 156/199 |

FOREIGN PATENT DOCUMENTS

| | | |
|---|---|---|
| EP | 0395224 A2 | 10/1990 |
| EP | 1070661 A2 | 1/2001 |
| EP | 1134070 | 9/2001 |
| EP | 1134070 A1 | 9/2001 |
| EP | 1408224 | 4/2004 |
| EP | 1547756 A1 | 6/2005 |
| EP | 1555204 A1 | 7/2005 |
| EP | 1566334 | 8/2005 |
| GB | 2312532 A | 10/1997 |
| JP | 59027722 | 2/1984 |
| JP | 59179228 | 10/1984 |
| JP | 61108404 A | 5/1986 |
| JP | 62207367 | 9/1987 |
| JP | 04299110 A | 10/1992 |
| JP | 05042590 A | 2/1993 |
| JP | 6226356 | 8/1994 |
| JP | 7089353 | 4/1995 |
| JP | 08025386 A | 1/1996 |
| JP | 08085159 A | 4/1996 |
| JP | 10137853 A | 5/1998 |
| JP | 2003053851 A | 2/2003 |
| JP | 2004351882 A | 12/2004 |
| RU | 214487 C1 | 1/2000 |
| RU | 2219058 C1 | 12/2003 |
| WO | 0024563 | 5/2000 |
| WO | 0037244 | 6/2000 |
| WO | 0196094 A2 | 12/2001 |
| WO | 0222440 A1 | 3/2002 |
| WO | 03082670 A1 | 10/2003 |
| WO | 2005105413 A2 | 11/2005 |
| WO | 2009004362 | 1/2009 |
| WO | 2009004364 | 1/2009 |

OTHER PUBLICATIONS

UK Search Report for GB 0813161.7 mailed Nov. 18, 2008.
International Search Report for PCT/GB2009/050846 mailed Mar. 12, 2010.

* cited by examiner

RAMPED STIFFENER AND APPARATUS AND METHOD FOR FORMING THE SAME

RELATED APPLICATIONS

The present application is a divisional of application Ser. No. 13/003,884, filed, Jan. 13, 2011 the disclosure of which is hereby incorporated by reference herein in its entirety, which is a national phase of PCT/GB2009/050846, filed Jul. 14, 2009 is based on, and claims priority from, Great Britain Application Number 0813161.7, filed Jul. 18, 2008, the disclosure of which is also incorporated herein by reference.

BACKGROUND TO THE INVENTION

In the fabrication of composite structures, for example within the aerospace industry, structural members are often attached to a composite skin to provide reinforcement of the skin. Such structural members may include substantially elongated stiffening members often referred to as stringers or stiffeners. A typical example of the use of stiffeners within the aerospace industry is in the formation of an aircraft wing in which a composite stringer is attached to the inner surface of a wing cover, or skin. The stringers or stiffeners may be formed to exhibit various cross-sectional geometries but are typically formed to be T-section. Typically T-section stiffeners are produced from flat, uncured, pre-impregnated composite laminates that are formed into L-sections that are then compressed back-to-back producing the desired T-section. This produces a T-section stiffener that is easily attached to a flat composite skin. However, it is increasingly common practice to vary the thickness of the composite skin to locally vary the strength of the skin as desired. The variations in thickness produce ramped, or non-planar, sections across the composite skin to which the stringers are to be attached. To make the elongate stiffeners conform to the ramped skin surface the stiffeners must be deformed to the required profile after being formed into either the separate L-sections or the finished T-section. Since this involves deforming the stiffeners across a three dimensional section, rather than the two dimensional section of the original planar laminate, wrinkling often occurs in the T-section stiffener where a portion of the composite laminate is compressed. Such wrinkles provide localised stress points, thus reducing the overall strength of the stiffener and therefore requiring the stiffener to be made larger than would otherwise be necessary, and can also prevent L-sections from being compressed back-to-back to form the required T-section stiffener.

It would therefore be beneficial to be able to form such stiffeners without experiencing the problem of wrinkling.

SUMMARY OF THE INVENTION

According to a first aspect of the present invention there is provided a die tool for forming a C-section component having radiused shoulders, the die tool comprising an inner die having a cylindrical body having a cylindrical outer surface connected to opposing planar end faces by respective radiused convex portions and an outer die having a cylindrical central portion connected to opposing end flanges by respective radiused concave portions, wherein a portion of the inner die is arranged to be disposed between the end flanges of the outer die and spaced apart there from to define a cavity corresponding to the desired cross-section of the C-section component to be formed, the radiused convex and concave portions have a radius of curvature that varies about the circumference of the respective inner and outer dies and the inner and outer dies are rotatable such that the radius of curvature of the radiused convex and concave portions where the inner and outer dies are adjacent to one another varies as the inner and outer dies are rotated.

Preferably both the inner and outer dies are telescopic such that the length of the dies along their rotational axis is variable. Additionally, the length of the inner and outer dies is preferably arranged to be varied as the dies are rotated. Furthermore, the length of the inner and outer dies is preferably arranged to increase as the radius of curvature of the radiused portions where the radiused portions are adjacent to one another decreases as the dies are rotated.

Additionally or alternatively the axes of rotation of the inner and outer dies may be parallel.

Similarly, the cylindrical outer surface of the inner die tool and central cylindrical portion of the outer die tool may be arranged to be parallel.

According to a further aspect of the present invention there is provided a method of forming an elongate fibre reinforced composite C-section element having outer flanges connected to a central web by radiused shoulders, the radius of curvature of the radiused shoulders being greater at one point along the length of the formed C-section than at another point, the method comprising passing an elongate portion of fibre reinforced composite material through the cavity of a die tool according to the first aspect of the invention and rotating the inner and outer dies as the composite materials pass through the cavity to change the radius of curvature of the radiused shoulders.

There is also provided in accordance with an aspect of the present invention a method of forming a fibre reinforced composite T-section stiffener comprising forming a C-section element according to the method of the further aspect of the invention and subsequently folding the C-section element along the central axis of the central web.

According to the present invention there is therefore provided a fibre reinforced composite T-section stiffener formed according to the method of the third aspect.

According to a further aspect of the present invention there is also provided a die tool for forming a top-hat section stiffener, the die tool comprising: a outer die having at least two axially aligned first cylindrical body sections, each first body section being connected to an opposing end face by a radiused shoulder, and at least one second cylindrical body section connected between the opposing end faces of adjacent first body sections, the diameter of the first cylindrical body sections being greater than the diameter of the second cylindrical body section; and an inner die having at least one third cylindrical body section having opposing end faces, each end face being connected to a respective axially aligned fourth cylindrical body section by a radiused concave portion, the diameter of each third cylindrical body section being greater than the diameter of the fourth cylindrical body sections, wherein: the inner and outer dies are disposed relative to one another such that each third body section of the inner die is disposed between adjacent first body sections of the outer die, the inner and outer dies being spaced apart from one another; the radiused shoulders of the outer die and radiused concave portions of the inner die have a radius of curvature that varies about the circumference of the respective cylindrical body sections; and the inner and outer dies are counter rotatable such that the radius of curvature of the radiused shoulders and radiused concave portions at any given point varies as the inner and outer dies are rotated.

Preferably the central axis of each second cylindrical body section of the outer die is offset from the axis of rotation of the outer die, the central axis of each third cylindrical body section of the inner die is offset from the axis of rotation of the inner die and the magnitude of the respective axial offsets of the inner and outer dies is equal. Additionally, the inner and outer dies are preferably arranged such that when the radius of curvature of the radiused shoulders of the outer die at the points adjacent to the inner die are at a maximum value each second cylindrical body of the outer die is at a minimum distance from the axis of rotation of the inner die such that the depth of the top-hat sections formed by the die tool is a minimum value.

The radius of curvature of the radiused shoulders of the outer die and of the radiused concave portions of the inner die may vary at an equal rate between minimum and maximum values over 180° of the circumference of the respective dies.

According to a subsequent aspect of the present invention there is provided a method of forming a fibre reinforced composite top-hat stiffener comprising passing a sheet of fibre reinforced composite material between the inner and outer dies of a die tool according to the previous aspect of the present invention and counter-rotating the inner and outer dies as the fibre reinforced material is passed between them.

BRIEF DESCRIPTION OF THE DRAWINGS

Embodiments of the present invention are described, by way of non-limiting illustrative example only, below with reference to the accompanying drawings, of which.

DESCRIPTION OF PREFERRED EMBODIMENTS OF THE INVENTION

Figure 1:
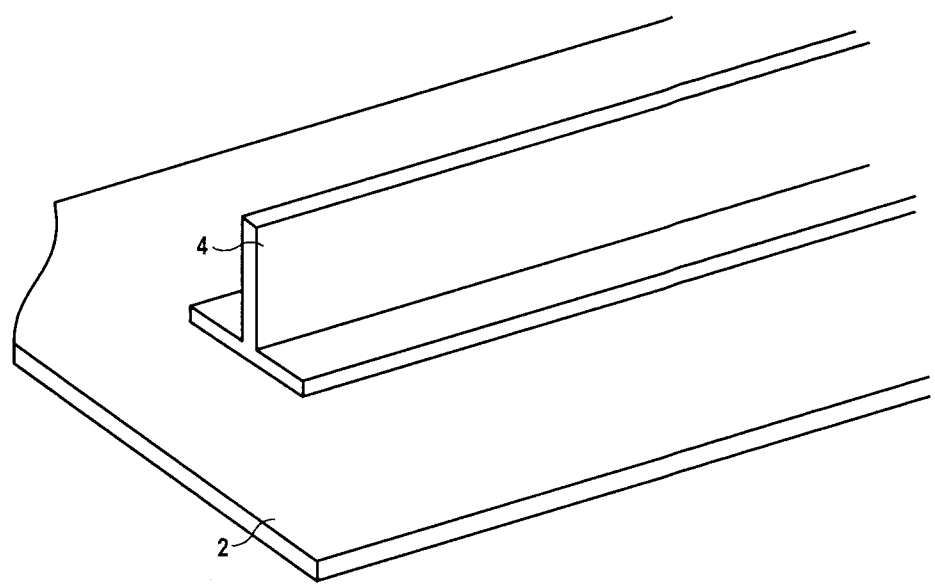
FIG. 1 illustrates a section of planar composite skin with an attached T-section stiffener.

FIG. 1 schematically illustrates a section of composite skin 2, such as an aircraft wing cover, to which a T-section stiffener 4 has been attached as is known from the prior art. The surface of the aircraft cover 2 to which the stiffener 4 has been attached is flat, meaning that the stiffener 4 need only be correspondingly flat across its attachment surface.

Figure 2:
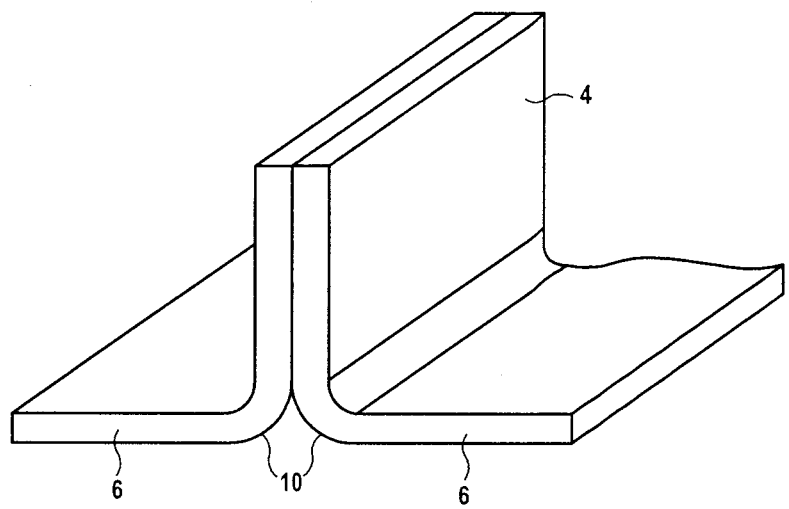
FIG. 2 illustrates a section of a T-section stiffener formed by two back-to-back L-section elements.
Figure 3:
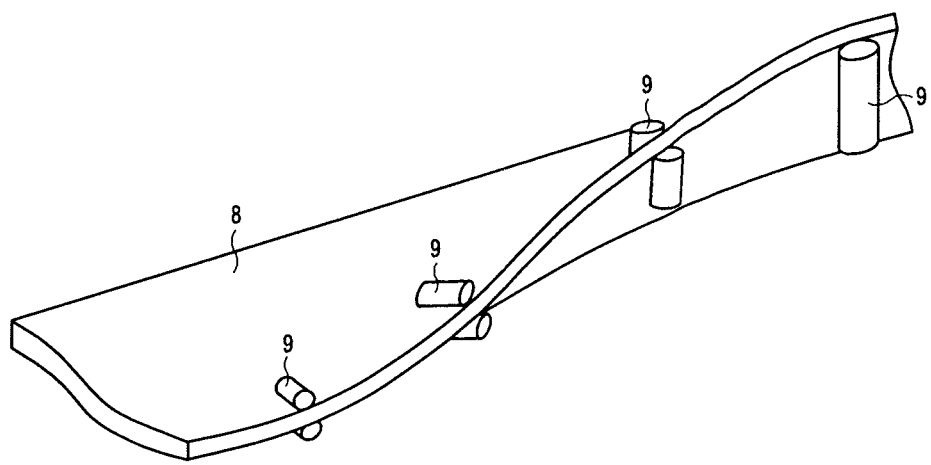
FIG. 3 schematically illustrates the formation of an L-section element from a planar laminate.

FIG. 2 illustrates an end portion of the stiffener 4 in better detail to illustrate a typical method of manufacture of such T-section stiffeners. The completed stiffener 4 actually comprises two separate L-section elongate elements 6 bonded together back-to-back. The L-section elements 6 are formed from elongate planar sections of composite laminate 8 (see FIG. 3) that is passed through a series of rollers and dies 9 that are arranged to bend one section of the elongate laminate in increments to approximately 90° to the remainder of the laminate, thus forming the L-section element 6 shown in FIG. 2. The planar composite laminate may be heated immediately prior to or as it is passed through the rollers and dies 8 to facilitate the bending of the laminate. As a consequence of this bending action the L-section elements 6 illustrated in FIG. 2 have a radiused elbow 10.

Figure 4:
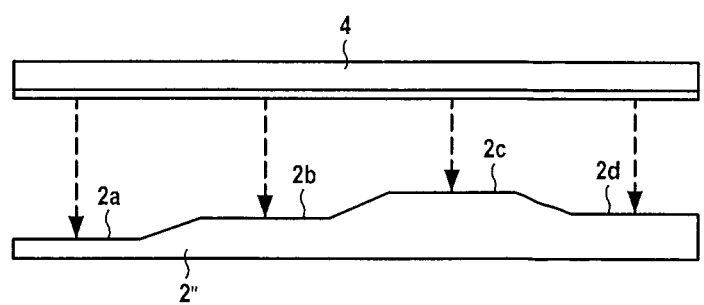
FIG. 4 schematically illustrates the placement of a T-section stiffener according to the prior art over a non-planar section of the composite skin.
Figure 5:
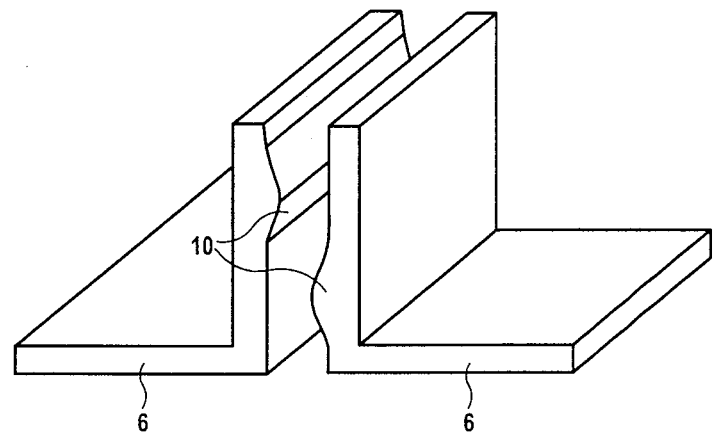
FIG. 5 schematically illustrates the formation of wrinkles onto adjacent L-section stiffener elements according to the prior art.

FIG. 4 schematically illustrates in cross-section a more typical arrangement of composite skin 2' and stiffener 4. In this more typical arrangement, the composite skin 2' is not planar but has sections of differing thickness 2A-2D, the section of differing thickness being provided in those areas that require greater or lower strength of the composite skin. As illustrated in FIG. 4, it will thus be appreciated that the prior art, planar, stiffener 4 cannot conform to the ramped profile of the skin cover 2' without undergoing some deformation. Whilst it is possible to deform the T-section stiffener to conform to the ramped profile of the composite cover 2', since the deformation involves either compressing or stretching those sections of the vertical portion of the T-section at the intersections between different thicknesses of the composite skin, wrinkling of the individual L-section elements 6 tends to occur. This is illustrated in FIG. 5 where each of the L-section elements 6 have an elongate wrinkle 12 formed on the surfaces to be abutted together to form the final T-section stiffener. The presence of these wrinkles 12 prevents the surfaces of the separate L-section elements from being abutted completely to one another, thus reducing the strength of the bond between the two L-section elements, and also introduce inherent weaknesses in the stiffener 4 due to such known processes as stress concentration.

Figure 6:
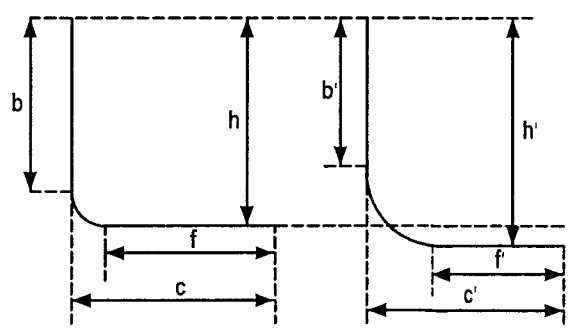
FIG. 6 schematically illustrates an L-section element with different radii of curvature according to an embodiment of the present invention.

The above described deformation of the L-section elements or final T-section stiffener can be avoided by varying the radius of curvature of the L-section elements, since this has the effect of varying the relative height of the stiffener feet (the part of the stiffener attached to the composite skin) relative to the overall height of the stiffener. This effect is illustrated in FIG. 6, in which two L-section elements are schematically represented in cross-section, one having a greater radius of curvature than the other. As previously mentioned, the planar part of the stiffener that is intended to be attached to the composite skin to be strengthened is referred to as the stiffener foot, whilst the height of the other planar section is generally referred to as the blade of the stiffener. The overall width of the stiffener, which is equal to the width of the foot plus the radius of curvature of the curved section joining the foot and blade is often referred to as the chord of the stiffener. In the cross-section illustrated in FIG. 6, the dimensions of the blade in the respective L-sections is represented by b, the width of the foot f and the chord c. The overall height of the stiffener measured from the top of the blade to the level of the foot is indicated by h. In most applications it is generally preferred to maintain the chord of the stiffener as constant and this illustrated in FIG. 6. The L-section element to the left-hand of FIG. 6 is shown having a smaller radius r, such that the chord of the stiffener c=r+f. In the L-section element on the right-hand side of FIG. 6 the radius curvature of the joining section has been increased to 3 r. However, since it is desired to maintain chord c as constant the width of the foot f has been reduced, as has the height of the blade b'. However, the overall height of the stiffener h'=b'+3 r is greater in the stiffener on the right-hand side of FIG. 6 than that of the stiffener on the left-hand side where h=b+r. Consequently, the net effect is for the foot in the L-section element having the greater radius of curvature to be lower than that of the stiffener having the smaller radius of curvature and it is therefore possible to produce a stiffener that can be attached to a ramped skin without suffering deformation. An example of such a stiffener is illustrated in FIG. 7, in which it can be seen that where the radius of curvature of the section adjoining the blade b and foot f is at its greatest, the level of the foot is lower than for the sections where the radius of curvature is reduced.

Figure 7:
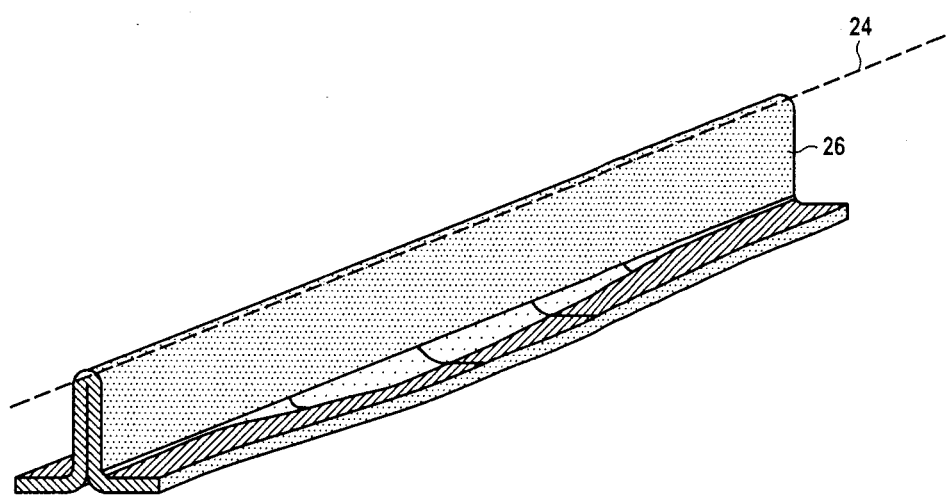
FIG. 7 schematically illustrates a T-section stiffener formed in accordance with the present invention.
Figure 8:
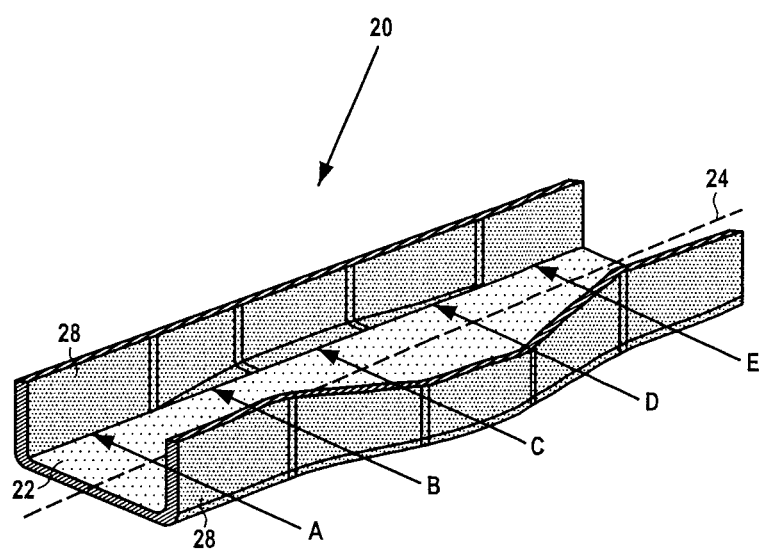
FIG. 8 schematically illustrates a C-section element formed in accordance with the present invention.

According to embodiments of the present invention stiffeners such as the example illustrated in FIG. 7 are produced by forming an elongate element with a C-shaped or U-shaped cross-section (effectively two L-section elements with the edges of their blades joined together) and subsequently folding the C-section elongate element along its length to form the desired T-section stiffener. An example of such a C-section elongate element formed in accordance with embodiments of the present invention is illustrated in FIG. 8. The C-section 20 shown in FIG. 8 as a central web 22 that when subsequently folded along its central axis, indicated by broken line 24 in FIG. 8, will form the central blade 26 of the stiffener illustrated in FIG. 7. Adjoined to each edge of the central web 22 are respective flanges 28 that correspond to the foot portions of the finally formed T-section stiffener. As illustrated schematically in FIG. 6, the flanges 28 are joined to the central web 22 by radiused sections. It will of course be appreciated that the flanges 28 and central web 22 are formed from a single, contiguous, piece of composite material. The C-section element 20 shown in FIG. 8 can be visually divided into separate sections A-E. Sections A and E have a minimum radius of curvature between the flanges 28 and central web 22, whilst section C has a maximum radius of curvature, thus causing the flange section at section C to be outwardly displaced relative to the flanges 28 for sections A and E. When the C-section element is folded along the central axis 24 this outward displacement of the flanges 28 at section C is translated into the ramped-down section of the T-stiffener. The radius of curvature between the flanges 28 and central web 22 in sections B and D that are between section C and A and E vary in related curvature between the maximum and minimum values to provide a smooth transition, which in the final T-section stiffener correspond to those sections in which the foot is in a plane diagonal to the planes in which the foot lies for those sections with a constant radius of curvature of either the minimum or maximum values.

The C-section element 20 illustrated in FIG. 8 is manufactured in accordance with embodiments of the present invention using cold forming techniques in which a C-section elongate element having a uniform cross-section is passed through a die tool shaped so as to impart the desired radius of curvatures between the central web 22 and flanges 28. A suitable die tool according to an embodiment of the present invention is illustrated in FIGS. 9 and 10.

Figure 9:
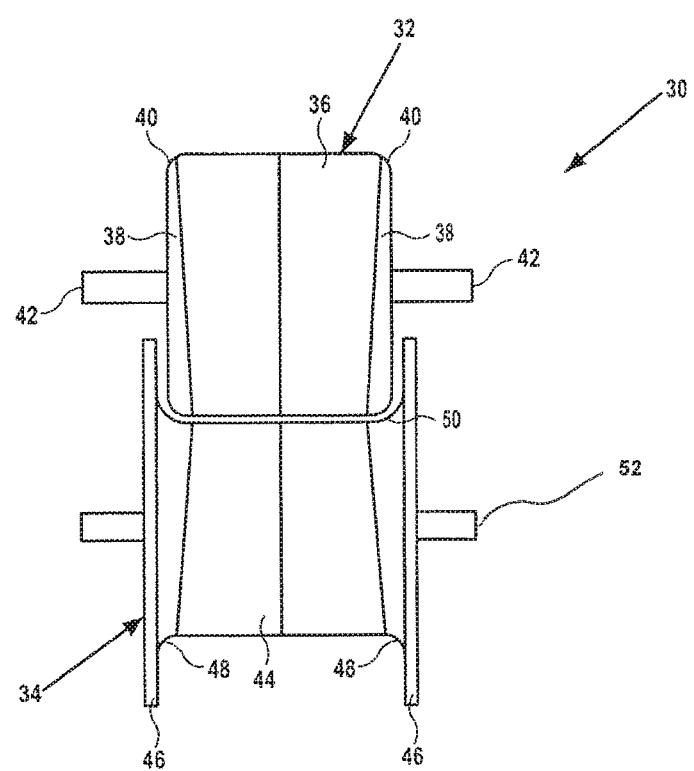
FIG. 9 schematically illustrates a die tool according to an embodiment of the present invention in a first configuration.
Figure 10:
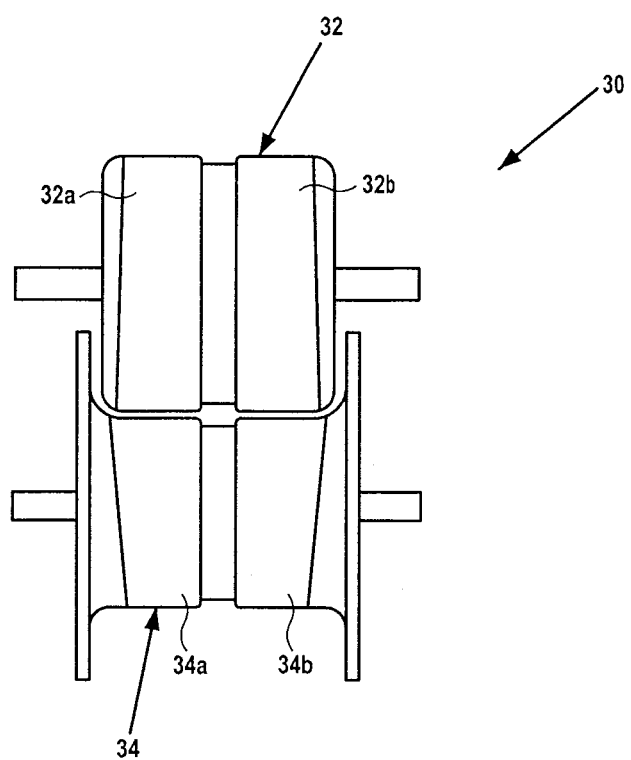
FIG. 10 schematically illustrates the die tool shown in FIG. 9 in a second configuration.

Referring to FIG. 9, the die tool 30 comprises an inner die 32 and an outer die 34. The inner die 32 has a generally cylindrical main body portion 36 that is bounded by two opposing end faces 38, such that the inner die 32 can be regarded as being generally drum-shaped. The end faces 38 of the inner die are joined to the outer surface of the cylindrical main body portion 36 by respective radiused shoulders 40. The inner die 32 is provided with a pair of stub axles 42, preferably aligned with the central axis of the inner die, by which the inner die 32 can be rotated.

The outer die 34 also has a generally cylindrical central portion 44. However, the central portion of the outer die is bounded by two opposing end flanges 46 whose diameter is greater than the diameter of the generally cylindrical central portion 44. The outer surface of the central portion 44 of the outer die and the inner faces of the end flanges 46 are connected by respective concave radiused portions 48. The outer die 34 also has a pair of stub axles 52, preferably aligned with the central axis of the outer die, to also allow the outer die to be rotated.

The inner and outer dies are arranged such that a portion of the inner die 32 is disposed between the inner faces of the end flanges 46 of the outer die 34 and with the inner and outer dies being separated from one another. The inner and outer dies are dimensioned such that when they are separated from one another by a certain distance they form a cavity 50 between the respective dies, the cavity 50 having the same cross-section as it is desired to be imposed upon the C-section element to be formed by passing a length of material, for example fibre reinforced composite material, through the cavity formed between the inner and outer dies. In the preferred embodiment illustrated, the outer surfaces of the main body 36 of the inner die 32 and the central portion 44 of the outer die 34 are parallel and the portion of the cavity formed therebetween corresponds to the central web of the C-section element to be formed. Similarly, the overlapping or adjacent portions of the end flanges 46 of the outer die and the end faces 38 of the inner die are parallel and the portion of the cavity formed therebetween corresponds to the outer flanges 28 of the C-section element to be formed. The convex radiused shoulders 40 of the inner die and the concave radiused portions 48 form a portion of the cavity that corresponds to the radiused shoulders of the C-section element connecting its side flanges and central web.

The radius of curvature of the convex radiused shoulders 40 of the inner die 32 varies between a maximum and a minimum value around the circumference of the inner die, whilst in an analogous fashion the radius of curvature of the concave radiused portions 48 of the outer die also varies between a maximum and minimum value about the circumference of the outer die. In preferred embodiments, and as illustrated in FIGS. 9 and 10, the radius of curvature of the radiused shoulders and radiused portions varies between the minimum and maximum values around 180° of the respective inner and outer die circumference, such that over the full 360° of the respective circumferences the radius of curvature varies from the maximum value down to the minimum value and then back again to the maximum value. In preferred embodiments the rate of change of radius of curvature between the minimum and maximum values is constant. Consequently, by aligning the inner and outer dies such that the radius of curvature for the respective radiused shoulders and radiused concave portions coincide at their maximum values, the radius of curvature of the corresponding portion of the cavity 50 defining the cross-section of the C-section element to be formed is set at a maximum value. This configuration is illustrated in FIG. 9. By rotating both the inner and outer dies 32, 34 through 180° the radius of curvature of the corresponding portion of the cavity 50 is decreased to a minimum value, this being the configuration illustrated in FIG. 10. By rotating the inner and outer dies simultaneously by any desired amount the radius of curvature of the curved portions of the cavity 50 can be set to any desired value between the minimum and maximum obtainable values.

As discussed above, it is usually preferable for the chord of the resultant T-section stiffener to be constant over the length of the stiffener regardless of the radius of curvature between the stiffener foot and blade. As discussed with reference to FIG. 6, the preference for a constant chord length requires the height of the blade of the resultant T-section stiffener to be varied. This translates to varying the width of the central web 22 of the C-section element from which the T-section stiffener is subsequently formed. To enable the width of the central web 22 to be varied as the C-section element is formed the inner and outer dies 32, 34 of the die tool 30 according to preferred embodiments of the present invention are both telescopic in a direction parallel to their axes of rotation. As best seen with reference to FIG. 10, each of the inner and outer dies 32, 34 is formed from two separate sections 32a, 32b, 34a, 34b. For the inner die 32 the cylindrical main body portion 36 of one of the sections has a reduced diameter over a portion of its length, the portion of reduced diameter being slidably received within the main body portion of the second section of the die such that the two sections 32a, 32b of the inner die can be slid with respect to one another about the central portion so as to vary the overall length of the central main body portion 36 of the die as a whole. Similarly, the cylindrical central portion of one of the sections 34a, 34b of the outer die is also of a reduced diameter and arranged to slidably fit within the cylindrical central portion of the opposing section of the outer die. By utilising appropriate actuators and control systems the rotation of the inner and outer dies can be synchronised with the extension and retraction of the separate die sections such that the length of the central portions of the inner and outer dies can be varied as the dies are rotated. The details of such actuators and control systems do not fall within the scope of the present invention and are therefore not discussed further.

As mentioned above, the described die tool according to embodiments of the present invention permits a C-section element having radiused shoulders of varying radius of curvature to be formed by forcing a C-section element of constant cross-section through the cavity formed between the inner and outer dies of the die tool of the present invention and rotating the die tools simultaneously whenever a variation in the radius of curvature is required.

A subsequent T-section stiffener can then be formed by simply folding the C-section element along the central axis of its central web, the resulting T-section stiffener having a foot height that varies as the radius of curvature of the radiused shoulders varies. By additionally controlling the width of the inner and outer dies, by telescoping them simultaneously with the rotation, the chord of the resultant T-section stiffener can be restrained to a constant value.

Figure 11:
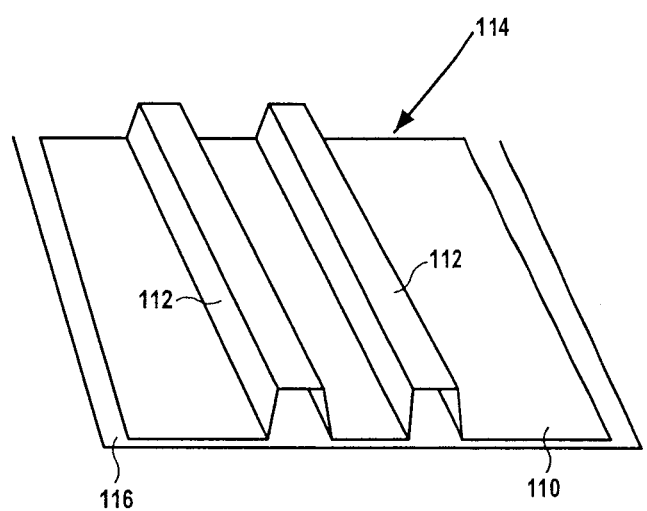
FIG. 11 schematically illustrates a top-hat stiffener according to the prior art.

In a further embodiment of the present invention there is provided a die tool for forming a top-hat stiffener. A typical top-hat stiffener according to the prior art is illustrated in FIG. 11 and comprises a generally planar sheet 110 in which are formed a number of generally U-shaped square or rectangular inverted channels 112, which when viewed end on have a similar rectangular cross-section to a top-hat, hence the term "top-hat stiffener". The top-hat stiffener 114 is subsequently secured to the planar elements 116 to be reinforced and acts to resist flexing or bending in a direction along the inverted channels 112. Typically, top-hat section stiffener systems are produced from flat uncured pre-impregnated composite laminates that rely on diaphragm forming of sections that are subsequently located within a closed section tool and cured. On forming regular planar/linear top-hat sections a negligible change is required from the two dimensional flat laminate on conversion to the three dimensional top-hat stiffener. In other words only linear edges are required to be formed. However, when the element to be reinforced, such as the previously described wing skin, includes ramped sections transverse to the direction of the top-hat section of the stiffener the inverted channels 112 must be effectively be deformed and therefore post form wrinkling is often encountered in such a prior art three dimensional ramped top-hat sections, in an analogous fashion to as previously discussed with the T-section stiffeners.

Figure 12:
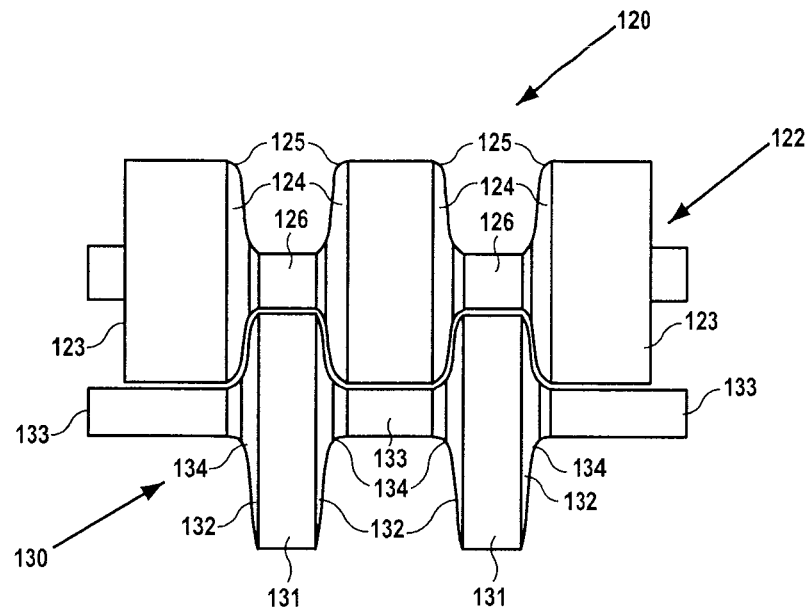
FIG. 12 schematically illustrates a die tool according to a further embodiment of the present invention for forming a top-hat stiffener.

Following the same principles as applied to the previously described embodiments of the present invention, a die tool according to a further embodiment of the present invention is provided that allows a ramped top-hat stiffener of constant cord length to be produced. An example of a die tool according to this embodiment of the present invention in a first configuration is illustrated in FIG. 12. The die tool 120 includes an outer die 122 that has a number of first cylindrical body sections 123, of which three are shown in the embodiment illustrated in FIG. 12. Adjacent first cylindrical body sections 123 have opposing end faces 124, there being a radiused shoulder 125 connecting each end face to the first cylindrical body section. Connected between each adjacent end face 124 is a second cylindrical body section 126, the diameter of the second body sections 126 being less than that of the first cylindrical body sections 123. The first cylindrical body sections 123 are axially aligned, as are the second cylindrical body sections 126. However, the central axis of the second cylindrical body sections 126 is laterally of set relative to the central axis of the first body sections 123. The outer die 122 is arranged to be rotated about the central axis of the first cylindrical body sections 123.

The die tool 120 also includes an inner die 130 that in turn has a number of third cylindrical body sections 131, each having a pair of end faces 132, each end face being connected to a fourth cylindrical body portion 133 by respective radiused concave portions 134, the diameter of the fourth cylindrical body sections 133 being less than the diameter of the third cylindrical body sections 131. The fourth cylindrical body sections 133 are axially aligned with their central axis being coincident with the axis of rotation of the inner die 130, whilst the third cylindrical section 131 are also axially aligned but with their central axis being offset from that of the axis of rotation of the die.

The inner and outer dies 130, 122 are dimensioned such that in use the larger diameter third body sections 131 of the inner die 130 are located between adjacent first body sections of the outer die 122, whilst in turn the larger third body sections 123 of the outer die are located between the third cylindrical body sections 131 of the inner die and are located opposite the fourth, smaller diameter, body sections 133 of the inner die. The inner and outer dies are spaced apart from one another by a distance substantially equal to the thickness of the fibre reinforced composite material from which it is desired to form the top-hat stiffener.

The radius of curvature of the concaved radiused portions 134 of the inner die 130 varies about the circumference of the die. In the particular configuration illustrated in FIG. 12 radius of curvature has a maximum value at the point adjacent to the outer die 122. Similarly, the radius of curvature of the radiused shoulders 125 of the outer die 122 also varies about the circumference of the die and in the configuration illustrated in FIG. 12 also has a maximum value at the point adjacent to the inner die 130. Consequently, the radius of curvature imparted onto the top-hat stiffener formed by passing fibre reinforced composite material between the inner and outer dies in the configuration illustrated in FIG. 12 is at a maximum value. In this configuration, due to the lateral offset of the second cylindrical portions 126 of the outer die 122 and the third cylindrical portions 131 of the inner die 130, the height of the top-hat sections, or inverted channels 112 referring to FIG. 11, is at a minimum value.

Figure 13:
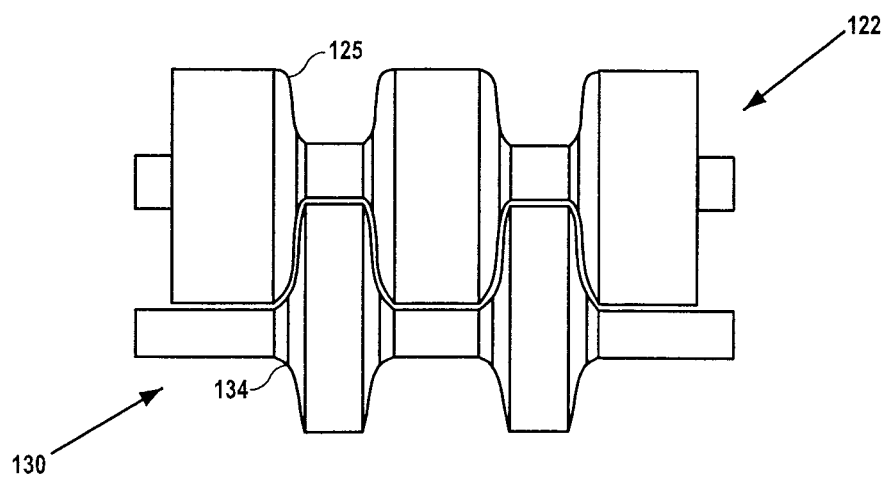
FIG. 13 illustrates the die tool of FIG. 12 in a further configuration.
Figure 14:
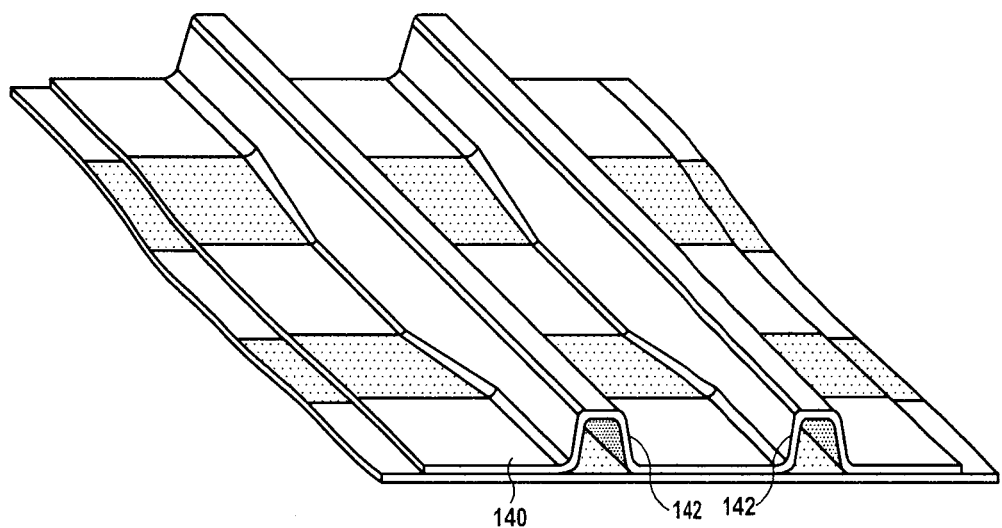
FIG. 14 schematically illustrates a ramped top-hat stiffener formed using the die tool of FIGS. 12 and 13 in accordance with the embodiment of the present invention.

FIG. 13 illustrates the same die tool 120 as shown in FIG. 12 in a second configuration in which the inner and outer dies 122, 130 have been rotated such that at their adjacent points the radius of curvature of the radiused shoulders 125 of the outer die and the radiused concave portions 134 of the inner die have a minimum value, whilst the distance between the second cylindrical body portions 126 of the outer die and the four cylindrical body portions 133 of the inner die is at a maximum due to the lateral offsets of the respective cylindrical body sections. Consequently, a top-hat stiffener now formed by passing fibre reinforced composite material between the dies in the configuration shown in FIG. 13 has a top-hat height that is greater than for the configuration shown in FIG. 12 with a smaller radius of curvature between the side walls of the top-hat section and the stiffener foot. In preferred embodiments the radius of curvature of the radiused shoulders 125 and radius concave portions 134 varies between their minimum and maximum values over the period of 180° rotation of the respective inner and outer dies. By appropriately rotating the inner and outer dies as a layer of fibre reinforced composite material is passed between them the height of the top-hat section, and therefore the height of the stiffener foot, can be varied so as to produce a top-hat stiffener with ramped sections. An example of a top-hat stiffener formed using the die tool 120 of this embodiment of the present invention is schematically illustrated in FIG. 14, where it can be seen that the height of the foot 140 of the stiffener varies over the length of the top-hat sections 142, with the radius of curvature formed between the foot and the side sections of the top-hat elements being at a minimum in those areas when the foot has been ramped down relative to the remainder of the stiffener.

The invention claimed is:

1. A die tool for forming a top-hat section stiffener, the die tool comprising:
an outer die having at least two axially aligned first cylindrical body sections, the at least two first cylindrical body sections each being connected to an opposing end face by a radiused shoulder, and at least one second cylindrical body section connected between the opposing end faces of adjacent ones of the at least two first cylindrical body sections, the diameter of the first cylindrical body sections being greater than the diameter of the second cylindrical body section; and
an inner die having at least one third cylindrical body section having opposing end faces, each end face being connected to a respective axially aligned fourth cylindrical body section by a radiused concave portion, the diameter of the at least one third cylindrical body section being greater than the diameter of the fourth cylindrical body sections, wherein:
the inner and outer dies are disposed relative to one another such that each third body section of the inner die is disposed between adjacent ones of the at least two first cylindrical body sections of the outer die, the inner and outer dies being spaced apart from one another,
the radiused shoulders of the outer die have a radius of curvature that varies about the circumference of the first and second cylindrical body sections, and the radiused concave portions of the inner die have a radius of curvature that varies about the circumference of the at last one third cylindrical body section and of the fourth cylindrical body sections; and
the inner and outer dies are counter rotatable such that the radius of curvature of the radiused shoulders and radiused concave portions at any given point varies as the inner and outer dies are rotated.

2. The die tool of claim 1, wherein:
the central axis of each of the at least one second cylindrical body section of the outer die is offset from the axis of rotation of the outer die;
the central axis of each of the at least one third cylindrical body section of the inner die is offset from the axis of rotation of the inner die; and
the magnitude of the respective axial offsets of the inner and outer dies is equal.

3. The die tool of claim 2, wherein the inner and outer dies are arranged such that when the radius of curvature of the radiused shoulders of the outer die at the points adjacent to the inner die are at a maximum value each of the at least one second cylindrical body of the outer die is at a minimum distance from the axis of rotation of the inner die such that the depth of the top-hat sections formed by the die tool is a minimum value.

4. The die tool of claim 1, wherein the radius of curvature radiused shoulders of the outer die and of the radiused concave portions of the inner die varies at an equal rate between minimum and maximum values over 180° of the circumference of the respective dies.

5. A method of forming a fibre reinforced composite top-hat stiffener comprising passing a sheet of fibre reinforced composite material between the inner and outer dies of a die tool comprising an outer die having at least two axially aligned first cylindrical body sections, the at least two first cylindrical body sections each being connected to an opposing end face by a radiused shoulder, and at least one second cylindrical body section connected between the opposing end faces of adjacent ones of the at least two first cylindrical body sections, the diameter of the first cylindrical body sections being greater than the diameter of the at least one second cylindrical boy section;
and an inner die having at least one third body section having opposing end faces, each end face being connected to a respective axially aligned fourth cylindrical body section by a radiused concave portion, the diameter of the at least one third cylindrical body section being greater than the diameter of the fourth cylindrical body sections, wherein: the inner and outer dies are disposed relative to one another such that each third body section of the inner die is disposed between adjacent ones of the at least two first cylindrical body sections of the outer die, the inner and outer dies being spaced apart from one another, the radiused shoulder of the outer die have a radius of curvature that varies about the circumference of the first and second cylindrical body sections, and the radiused concave portions of the inner die have a radius of curvature that varies about the circumference of the at least one third cylindrical body section and of the fourth cylindrical body sections; the inner and outer dies are counter rotatable such that the radius of curvature of the radiused shoulders and radiused concave portions at any given point varies as the inner and outer dies are rotated, and; counter-rotating the inner and outer dies as the fibre reinforced material is passed between them.

* * * * *